United States Patent Office 3,773,773
Patented Nov. 20, 1973

3,773,773
N-ALKYL-1,4-DIHYDROPYRIDINES AND
THEIR PRODUCTION
Friedrich Bossert, Wuppertal-Elberfeld, Germany, assignor to Bayer Aktiengesellschaft, Leverkusen, Germany
No Drawing. Continuation of abandoned application Ser. No. 35,574, May 7, 1970. This application Nov. 22, 1971, Ser. No. 201,152
Claims priority, application Germany, May 10, 1969, P 19 23 990.8
Int. Cl. C07d 31/50
U.S. Cl. 260—294.8 D         6 Claims

ABSTRACT OF THE DISCLOSURE

N-alkyl-1,4-dihydropyridines of the formula:

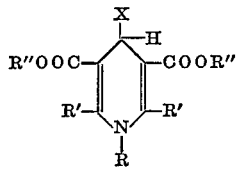

wherein

R is a saturated or unsaturated straight or branched chain aliphatic moiety, a saturated or unsaturated cyclo aliphatic moiety, said cycloaliphatic moiety having an N, S or O heteroatom, said cycloaliphatic moiety or said cycloaliphatic moiety having an N, S, or O heteroatom substituted by carboxy, carbalkoxy, alkoxy, especially lower alkoxy, alkylmercapto, especially lower alkylmercapto, alkylamino, especially lower alkylamino, or dialkylamino, especially di-lower alkylamino, an araliphatic moiety or an araliphatic moiety substituted by alkyl, especially lower alkyl, alkoxy, especially lower alkoxy, nitro or halogen, R' is hydrogen or straight or branched chain alkyl of 1 to 4 carbon atoms, aryl, aryl substituted by alkyl, especially lower alkyl, nitro or halogen, or a heterocycle, R" is a saturated or unsaturated, straight or branched chain aliphatic moiety of 1 to 6 carbon atoms, a saturated or unsaturated cycloaliphatic moiety or said cycloaliphatic moiety having an N, S or O heteroatom, and X is a saturated or unsaturated, straight or branched chain aliphatic or isocyclic moiety, a heterocycle, aryl, aryl substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen, aralkyl, aralkylene or aralkyl or aralkylene substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen, are produced by reacting an aldehyde of the formula:

X—CHO wherein
X is as above defined with a β-ketocarboxylic acid ester of the formula:

R'—CO—CH$_2$—COOR"

wherein
R' and R" are as above defined with a salt of an alkylamine of the formula:

R—NH$_2$ wherein
R is above defined, in the presence of an acid acceptor. However when one of the reactants already has acid-binding properties, the acid acceptor is not essential.

These N-alkyl-1,4-dihydropyridines are useful for their coronary dilating effect and are also useful as blood pressure depressing agents.

---

This is a continuation of application Ser. No. 35,574, filed May 7, 1970, now abandoned.

The present invention is concerned with N-alkyl-1,4-dihydropyridines and their production. More particularly, the present invention is concerned with N-alkyl-1,4-dihydropyridines of the formula:

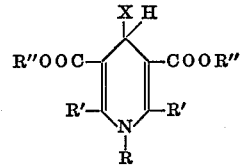

wherein

R is a saturated or unsaturated straight or branched chain aliphatic moiety, a saturated or unsaturated cycloaliphatic moiety, said cycloaliphatic moiety having an N, S or O heteroatom, said cycloaliphatic moiety or said cycloaliphatic moiety having an N, S, or O heteroatom substituted by carboxy, carbalkoxy, alkoxy, especially lower alkoxy, alkylmercapto, especially lower alkylmercapto, alkylamino, especially lower alkylamino, or dialkylamino, especially di-lower alkylamino, an araliphatic moiety or an araliphatic moiety substituted by alkyl, especially lower alkyl, alkoxy, especially lower alkoxy, nitro or halogen, R' is hydrogen or straight or branched chain alkyl of 1 to 4 carbon atoms, aryl, aryl substituted by alkyl, especially lower alkyl, nitro or halogen, or a heterocycle, R" is a saturated or unsaturated, straight or branched chain aliphatic moiety of 1 to 6 carbon atoms, a saturated or unsaturated cycloaliphatic moiety or said cycloaliphatic moiety having an N, S or O heteroatom, and X is a saturated or unsaturated, straight or branched chain aliphatic or isocyclic moiety, a heterocycle, aryl, aryl substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen, aralkyl, aralkylene or aralkyl or aralkylene substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen.

The production of N-alkyl-1,4-dihydropyridines from aldehydes and β-alkylaminocrotonic acid esters is known [Belgian patent specification No. 710,391; Helv. Chim. Acta, 41 (1958), 20661].

It is further known that N-alkyl-1,4-dihydropyridines can also be obtained by the oxidation of 1,4-dihydropyridines to form pyridines, quaternization with alkyl halides and reduction of the quaternary ammonium compounds [for literature references see above].

However, it has not been possible generally to translate the known preparation of 1,4-dihydropyridines by the reaction of aldehyde with β-ketocarboxylic acid esters and ammonia to the preparation of N-alkyl-1,4-dihydropyridines from aldehydes, β-ketocarboxylic acid esters and alkylamines.

Some N-alkyl-1,4-dihydropyridines and a method for their production are disclosed in U.S. Ser. No. 880,946, filed Nov. 28, 1969.

It has now been found that N-alkyl-1,4-dihydropyridines of the formula:

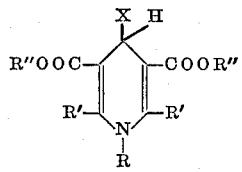

wherein R, R', R'' and X are as above defined may be produced in a direct way which results in high yield by reacting aldehydes of the general formula:

X—CHO with β-ketocarboxylic acid esters of the formula:

R'—CO—CH₂—COOR'' wherein R' and R'' are as above defined with salts of alkylamines of the formula:

R—NH₂ wherein R is as above defined in the presence of an acid acceptor. The addition of the acid acceptor is, however, unnecessary when one of the reaction components already has acid-binding properties. For example, N-alkyl-1,4-dihydropyridines are produced by reacting pyridine aldehydes, β-ketocarboxylic acid esters via the corresponding salts, and alkylamine salts by heating in an organic solvent such as alcohols without the addition of a further acid acceptor.

According to the present invention, the preferred salts of the alkylamines include the acid addition salts with inorganic acids, such as hydrohalic acids, sulphuric acid, nitric acid, phosphoric acid and the like, as well as the acid addition salts with organic acids, such as acetic acid.

Suitable acid acceptors are basic compounds, such as tertiary amines, such as trialkylamines, pyridine, picoline, quinoline, N-methyl-piperidine, N - methyl-morpholine, N,N-dimethylpiperazine, as wel las the alkalamines corresponding to the alkylamine salts, that is alkylamines of the formula:

R—NH₂ wherein R is as above defined.

Pyridine has been found to be particularly suitable and it is used in the amount equivalent to the alkylamine salt or, if no organic solvent is used, in excess.

The compounds of the present invention are particularly useful for their coronary dilating effect and are also useful as blood pressure depressants.

They are administered in the same general manner and amount as known coronary dilators and blood pressure depressants.

The following examples more particularly illustrate the present invention.

EXAMPLE 1

N-methyl-2,4,6-trimethyl-1,4-dihydropyridine-3,5-dicarboxylic acid diethyl ester 8.8 g. acetic aldehyde, 52 cc. acetoacetic acid ethyl ester and 16 g. methylamine hydrochloride are heated in 40 cc. pyridine for ½ to 1 hour at 100° C. (external temperature), the mixture is subsequently poured into ice-water while stirring, taken up with ether after decanting, and rinsing with water, the ether is distilled off, and 18 g. of almost colourless crystals of M.P. 84° C. are obtained from petroleum ether (animal charcoal).

In the same way, N-methyl-2,6-dimethyl-4-isopropyl-1,4-dihydropyridine-3,5-dicarboxylic acid diethyl ester is obtained in the form of white crystals of M.P. 73° C. (28 g.) by reacting isobutyraldehyde with acetoacetic acid ethyl ester and methylamine hydrochloride.

In the same way, N-methyl-2,6-dimethyl-4-n-hexyl-1,4-dihydropyridine-3,5-dicarboxylic acid dimethyl ester, M.P. 65° C. is obtained by reacting caproaldehyde with acetoacetic acid dimethyl ester and methylamine hydrochloride.

EXAMPLE 2

N-methyl-2,6-dimethyl-4-phenyl-1,4-dihydropyridine-3,5-dicarboxylic acid diethyl ester After heating 21 g. benzaldehyde, 52 cc. acetoacetic acid ethyl ester and 16 g. methylamine hydrochloride in 50 cc. pyridine at 100° C. for two hours, the mixture is poured into ice-water, suction-filtered, the filtrate is rinsed with water, and 36 g. of yellow crystals of M.P. 130 to 131° C. are obtained from about 250 to 300 cc. of alcohol.

In the same way, the following compounds were prepared from the reactants listed:

(a) N-methyl-2,6-dimethyl-4-(2' - trifluoromethylphenyl)-1,4-dihydropyridine-3,5-dicarboxylic acid dimethyl ester of M.P. 164° C. from 2-trifluoromethyl benzaldehyde, acetoacetic acid methyl ester and methylamine hydrochloride;

(b) N-methyl-2,6-dimethyl-4-(3' - trifluoromethylphenyl)-1,4-dihydropyridine-3,5 - dicarboxylic acid dimethyl ester of M.P. 110° C. from 3-trifluoromethyl benzaldehyde, acetoacetic acid methyl ester and methylamine hydrochloride;

(c) N-methyl-2,6-dimethyl-4-(phenyl-4'-hydroxy acetic acid ethyl ester) - 1,4 - dihydropyridine-3,5-dicarboxylic acid diethyl ester of M.P. 108° C. from benzaldehyde-4-hydroxy acetic acid ethyl ester, acetoacetic acid ethyl ester and methylamine hydrochloride;

(d) N-isopropyl-2,6-dimethyl-4-(2'-nitrophenyl) - 1,4-dihydropyridine-3,5-dicarboxylic acid dimethyl ester of M.P. 187° C. from 2-nitro-benzaldehyde, acetoacetic acid methyl ester and methylamine hydrochloride;

(e) N - methyl-2,6-dimethyl-4-(2'-nitro-3'-chlorophenyl)-1,4-dihydropyridine-3,5 - dicarboxylic acid dimethyl ester of M.P. 164° C. from 2-nitro-3-chlorobenzaldehyde, acetoacetic acid methyl ester and methylamine hydrochloride;

(f) N - methyl-2,6-dimethyl-4-(2'-nitro-4'-chlorophenyl)-1,4-dihydropyridine - 3,5 - dicarboxylic acid dimethyl ester of M.P. 136° C. from 2-nitro-4-chlorobenzaldehyde, acetoacetic acid methyl ester and methylamine hydrochloride;

(g) N-methyl-2,6-dimethyl-4-(3'-nitro - 4' - methoxyphenyl)-1,4-dihydropyridine - 3,5 - dicarboxylic acid dimethyl ester of M.P. 143° C. from 3-nitro-4-methoxybenzaldehyde, acetoacetic acid methyl ester and methylamine hydrochloride;

(h) N-methyl-2,6-dimethyl-4-(2'-methoxy - 4' - nitrophenyl)-1,4-dihydropyridine - 3,5 - dicarboxylic acid dimethyl ester of M.P. 178° C. from 2-methoxy-4-nitrobenzaldehyde, acetoacetic acid methyl ester and methylamine hydrochloride;

(i) N-methyl-2,6-dimethyl-4-(2'-nitro-5'-methoxyphenyl)-1,4-dihydropyridine-3,5 - dicarboxylic acid dimethyl ester of M.P. 144° C. from 2-nitro-5-methoxybenzaldehyde, acetoacetic acid methyl ester and methylamine hydrochloride;

(j) N - methyl-2,6-diethyl-4-(3'-nitrophenyl)-1,4-dihydropyridine-3,5-dicarboxylic acid diethyl ester of M.P. 66° C. from 3-nitrobenzaldehyde, levulinic acid ethyl ester and methylamine hydrochloride; and (k) N-methyl-2,6-dimethyl-4-(4'-carbmethoxyphenyl)-1,4-dihydropyridine-3,5-dicarboxylic acid dimethyl ester of M.P. 149° C. from 4-carbmethoxybenzaldehyde, acetoacetic acid methyl ester and methylamine hydrochloride.

EXAMPLE 3

N - methyl - 2,6 - dimethyl - 4 - (3' - nitro - 4' - chlorophenyl) - 1,4 - dihydropyridine - 3,5-dicarboxylic acid dimethyl ester 18.5 g. 4-chloro-3-nitro-benzaldehyde, 25 cc. acetoacetic acid methyl ester and 8.5 g. methylamine hydrochloride are heated in 40 cc. pyridine at about 90° C.

for 1 hour, the mixture is poured into water, and after filtering off with suction and recrystallization from methanol, 31 g. of pale brown crystals of M.P. 128° C. are obtained.

In the same way, the following compounds were prepared from the reactants listed:

(a) N - methyl - 2,6 - dimethyl - 4 - (3' - nitro - 6'-chlorophenyl)-1,4-dihydropyridine-3,5 - dicarboxylic acid dimethyl ester of M.P. 192° C. from 6-chloro-3-nitrobenzaldehyde, acetoacetic acid methyl ester and methylamine hydrochloride;

(b) N - n - butyl - 2,6 - dimethyl - 4 - (3'-nitro-6'-chlorophenyl)-1,4-dihydropyridine - 3,5-dicarboxylic acid dimethyl ester of M.P. 158° C. from 6-chloro-3-nitrobenzaldehyde, acetoacetic acid methyl ester and n-butylamine hydrochloride.

EXAMPLE 4

N-methyl-2,6-dimethyl - 4 - (4' - methoxyphenyl)-1,4-dihydropyridine-3,5-dicarboxylic acid dimethyl ester (a) 14 g. 4-methoxy-benzaldehyde, 25 cc. acetoacetic acid methyl ester and 7 g. methylamine hydrochloride are heated in 20 cc. pyridine at 70 to 80° C. for 1 to 2 hours, the mixture is poured into water, suction-filtered, and 18 g. of white crystals of M.P. 159 to 161° C. are obtained from 220 cc. methanol (animal charcoal).

(b) After heating a solution of 14 g. 4-methoxy-benzaldehyde, 25 cc. acetoacetic acid methyl ester, 7 g. methylamine hydrochloride and 7 cc. pyridine in 100 cc. methanol for two hours, the product is filtered off (animal charcoal) and cooled. After filtering off with suction and washing with cold ether, crystals of M.P. 158 to 160° C. (14 g.) are obtained.

In the same way, the following compounds were prepared from the reactants listed:

(a) N-methyl-2,6-dimethyl - 4 - (3',4',5' - trimethoxyphenyl) - 1,4 - dihydropyridine - 3,5 - dicarboxylic acid dimethyl ester, M.P. 119 to 122° C. according to the process of Example 4(a) from 3,4,5-trimethoxy-benzaldehyde, acetoacetic acid methyl ester and methylamine hydrochloride;

(b) N - methyl - 2,6 - dimethyl - 4 - (4' - nitrophenyl)-1,4 - dihydropyridine - 3,5 - dicarboxylic acid dimethyl ester, M.P. 158 to 160° C. according to the process of Example 4(a) from 4 - nitro - benzaldehyde, acetoacetic acid methyl ester and methylamine hydrochloride;

(c) N - methyl - 2,6 - dimethyl - 4 - (4' - dimethylaminophenyl) - 1,4 - dihydropyridine - 3,5 - dicarboxylic acid dimethyl ester, M.P. 145 to 146° C. according to the process of Example 4(a) from 4-dimethylamino-benzaldehyde, acetoacetic acid methyl ester and methylamine hydrochloride.

EXAMPLE 5

N-methyl-2,6-dimethyl - 4 - (3'-nitrophenyl)-1,4-dihydropyridine-3,5-dicarboxylic acid di-β-propoxyethyl ester 15 g. 3-nitro-benzaldehyde are heated with 8 g. methylamine hydrochloride and 40 cc. acetoacetic acid β-propoxyethyl ester in 30 cc. pyridine at about 90° C. for 5 to 6 hours, the mixture is poured into ice-water, and after filtering off with suction and drying, 46 g. of yellow crystals of M.P. 53 to 56° C. are obtained; these are recrystallized from 700 to 800 cc. ligroin (animal charcoal). Pale yellow crystals of M.P. 54° C.

EXAMPLE 6

N-methyl-2,6-dimethyl-4-ethylphenyl-1,4-dihydropyridine-3,5-dicarboxylic acid dimethyl ester After heating 13.4 g. hydrocinnamic aldehyde, 25 cc. acetoacetic acid methyl ester and 8 g. methylamine hydrochloride in 20 cc. pyridine for 3 hours, the mixture is poured into ice-water and suction-filtered. 12 g. of white crystals of M.P. 108 to 110° C. are obtained from 100 cc. methanol.

In the same way, N-methyl-2,6-dimethyl-4-styryl-1,4-dihydropyridine - 3,5 - dicarboxylic acid dimethyl ester, M.P. of 146 to 148° C. (methanol) is obtained by reacting cinnamic aldehyde, acetoacetic acid methyl ester and methylamine hydrochloride.

EXAMPLE 7

N-methyl-2,6-dimethyl - 4 - (α - pyridyl) - 1,4 - dihydropyridine-3,5-dicarboxylic acid diethyl ester 10 cc. pyridine - 2 - aldehyde, 28 cc. acetoacetic acid ethyl ester and 8 g. methylamine hydrochloride are heated at about 90° C. for ¾ to 1 hour, the mixture is subsequently poured into water, and after filtering off with suction and recrystallization from 100 cc. methanol, 14 g. of pale yellow crystals of M.P. 104 to 106° C. are obtained.

In the same way, N-methyl-2,6-dimethyl-4-(α-pyridyl)-1,4 - dihydropyridine - 3,5 - dicarboxylic acid diisopropyl ester, M.P. at 115° C. is obtained by reacting pyridine-2-aldehyde, acetoacetic acid isopropyl ester, and methylamine hydrochloride.

In the same manner, N-allyl-2,6-dimethyl-4-(α-pyridyl)-1,4-dihydropyridine-3,5-dicarboxylic acid dimethyl ester, M.P. at 106° C. is obtained by reacting pyridine-2-aldehyde, acetoacetic acid methyl ester, and allylamine hydrochloride.

EXAMPLE 8

N-methyl-2,6-dimethyl-4-(β-pyridyl)-1,4-dihydropyridine-3,5-dicarboxylic acid and di-(β-propoxyethyl) ester After heating 10 cc. 3-pyridine-aldehyde, 40 cc. acetoacetic acid β-propoxyethyl ester and 8 g. methylamine hydrochloride in 30 cc. pyridine at about 90° C. for 3 to 4 hours, the mixture is poured into ice-water, suction-filtered, the filtrate is dried (33 g.) and recrystallized from 500 to 600 g. ligroin/animal charcoal; crystals of M.P. 56° C.

In the same way, the following compounds were prepared from the reactants listed:

(a) N-methyl - 2,6 - dimethyl-4-(α-pyridyl)-1,4-dihydropyridine-3,5-dicarboxyic acid-di-β-propoxyethyl ester of M.P. 80 to 82° C. (ligroin) from pyridine-2-aldehyde, acetoacetic acid β-propoxyethyl ester and methylamine hydrochloride;

(b) N-methyl - 2,6 - diethyl-4-(α-pyridyl)-1,4-dihydropyridine-3,5-dicarboxylic acid diethyl ester, M.P. 116° C. from pyridine-2-aldehyde, acetoacetic acid ethyl ester and ethylamine hydrochloride.

EXAMPLE 9

N-benzyl-2,6-dimethyl-4-(α-pyridyl)-1,4-dihydropyridine-3,5-dicarboxylic acid dimethyl ester A solution of 10 cc. pyridine-2-aldehyde, 25 cc. acetoacetic acid methyl ester and 15 g. benzylamine hydrochloride in 100 c. methanol is heated at boiling temperature overnight, the mixture is concentrated by evaporation in a vacuum, and 20 g. of pale yellow crystals of M.P. 177 to 180° C. (HCl salt) are obtained from 200 to 250 cc. acetone. The free compound melts at 130° C.

EXAMPLE 10

N-carbethoxymethyl-2,6-dimethyl-4-(α-pyridyl)-1,4-dihydropyridine-3,5-dicarboxylic acid dimethyl ester 10 cc. pyridine-2-aldehyde, 25 cc. acetoacetic acid methyl ester and 14 g. aminoacetic acid ethyl ester hydrochloride are heated in 50 cc. methanol at boiling temperature overnight, the mixture is concentrated by evaporation in a vacuum, mixed with acetone, suction-filtered and again evaporated. The residue is dissolved in a little water, a sodium carbonate solution is added, and the solution is extracted several times with ether. The crystals obtained after drying and distilling off the ether (12 g., M.P. 85 to 90° C.) are recrystallized from ether/petroleum ether. White crystals of M.P. 102 to 104° C.

In the same manner, N-carbethoxymethyl-2,6-dimethyl-4-(β-pyridyl)-1,4-dihydropyridine - 3,5 - dicarboxylic acid dimethyl ester, M.P. 116 to 118° C. is obtained by reacting pyridine-3-aldehyde, acetoacetic acid methyl ester, and aminoacetic acid ethyl ester hydrochloride.

EXAMPLE 11

N-methyl-2,6-dimethyl-4-(α-tetrahydropyranyl)-1,4-dihydropyridine-3,5-dicarboxylic acid diethyl ester 11 cc. α-tetrahydropyranaldehyde, 28 cc. acetoacetic acid ethyl ester and 8 g. methylamine hydrochloride are heated in 200 cc. pyridine at about 90° C. for 4 hours. The mixture is subsequently poured into ice-water, suction filtered and after recrystallization from alcohol, white crystals of M.P. 122 to 124° C. are obtained.

In the same manner, N-methyl-2,6-dimethyl-4-(α-tetrahydropyranyl)-1,4-dihydropyridine-3,5-dicarboxylic acid dimethyl ester, M.P. 133° C. is obtained by reacting α-tetrahydropyranaldehyde, acetoacetic acid methyl ester and methylamine hydrochloride.

Example 12 below provides a comparison demonstrating the superiority of the process of the present invention which utilizes an alkylamine salt (see method (b) of Example 12) as compared to a known process using an alkylamine (see method (a) of Example 12).

EXAMPLE 12

N-methyl-2,6-dimethyl-4-(α-pyridyl)-1,4-dihydropyridine-3,5-dicarboxylic acid dimethyl ester (a) After heating a solution of 20 cc. pyridine-2-aldehyde, 50 cc. acetoacetic acid methyl ester and 30 cc. of a 30 to 40% aqueous methylamine solution in 100 cc. methanol under reflux for 2 to 3 hours, the product is filtered off with suction through animal charcoal and concentrated to half its volume. After the addition of ether and cooling, 5 g. of pale yellow crystals are obtained. White crystals of M.P. 160 to 162° F. from methanol.

(b) 20 cc. pyridine-2-aldehyde, 50 cc. acetoacetic acid methyl ester and 14 g. methylamine hydrochloride are heated in 100 cc. methanol at boiling temperature for several hours, the mixture is somewhat concentrated by evaporation in a vacuum, and after cooling, filtering off with suction and washing with acetone and ether, 25 g. of yellow-green crystals (hydrochloride) of M.P. 198° C. are obtained.

The free compound is obtained from the hydrochloride in the form of colourless crystals of M.P. 160 to 162° C. (methanol).

In the same way (method (b)) the following compounds were obtained via the hydrochlorides:

(a) N-methyl-2,6-dimethyl-4-(α - pyridyl)-1,4-dihydropyridine-3,5-dicarboxylic acid-di-(β-methoxyethyl) ester of M.P. 106 to 108° C. from pyridine-2-aldehyde, acetoacetic acid β-methoxyethyl ester, and methylamine hydrochloride;

(b) N-ethyl-2,6-dimethyl-4-(α-pyridyl) - 1,4 - dihydropyridine-3,5-dicarboxylic acid dimethyl ester, M.P. 122 to 124° C. from pyridine-2-aldehyde, acetoacetic acid methyl ester, and ethylamine hydrochloride;

(c) N - isopropyl-2,6-dimethyl-4-(α-pyridyl)-1,4-dihydropyridine-3,5-dicarboxylic acid dimethyl ester, M.P. 129 to 131° C. from pyridine-2-aldehyde, acetoacetic acid methyl ester and isopropylamine hydrochloride.

EXAMPLE 13

N-methyl-2,6-dimethyl-4-(α-thienyl)-1,4-dihydropyridine-3,5-dicarboxylic acid dimethyl ester A solution of 12 cc. thiophen-2-aldehyde, 25 cc. acetoacetic acid methyl ester and 8 g. methylamine hydrochloride in 20 cc. pyridine is heated with stirring at 90 to 100° C. for 2 hours, the mixture is poured into water, the product is filtered off with suction and rinsed with water. White crystals of M.P. 208° C. (21 g. from alcohol).

EXAMPLE 14

N-methyl-2,6-diphenyl-4-(4'-nitrophenyl)-1,4-dihydropyridine-3,5-dicarboxylic acid diethyl ester After heating 15 g. 4-nitro-benzaldehyde, 36 cc. benzoylacetic acid ethyl ester and 9 g. methylamine hydrochloride in 30 cc. pyridine at 100° C. (external temperature) for about 20 hours, the mixture is poured into ice-water, the crystalline residue obtained, after decanting, by the addition of some ether is filtered off with suction and recrystallized from alcohol. Yellow crystals (19 g.) of M.P. 200° C. are obtained.

The N-methyl-2,4,6-tri(4'-nitrophenyl) - 1,4 - dihydropyridine-3,5-dicarboxylic acid diethyl ester obtained in the same way after heating for 48 hours has M.P. 166° C. (alcohol).

EXAMPLE 15

N-methyl-2,6-di-(γ-pyridyl)-4-(2'-nitrophenyl)-1,4-dihydropyridine-3,5-dicarboxylic acid diethyl ester 15 g. 2-nitro-benzaldehyde, 38 g. γ-pyridoylacetic acid ethyl ester and 9 g. methylamine hydrochloride are heated in 60 cc. pyridine at 100° C. for about 3 hours, the mixture is poured into ice-water and after drying and recrystallization from ligroin/benzene, crystals (15 g.) M.P. 115° C. are obtained.

EXAMPLE 16

N-benzyl-2,6-dimethyl-4-(3'-trifluoromethylphenyl)-1,4-dihydropyridine-3,5-dicarboxylic acid dimethyl ester 17.5 g. 3-trifluoromethyl-benzaldehyde, 15 g. benzylamine hydrochloride and 25 cc. acetoacetic acid methyl ester are heated in 30 cc. pyridine at about 90° C. for 4 hours, the mixture is poured into ice-water, suction-filtered, and 17 g. of white crystals of M.P. 115° C. are obtained from methanol.

In the same manner, N-benzyl-2,6-dimethyl-4-(3'-nitro-6'-chlorophenyl)-1,4-dihydropyridine - 3,5 - dicarboxylic acid dimethyl ester, M.P. 166° C. is obtained from 3-nitro-6-chlorobenzaldehyde, acetoacetic acid methyl ester and benzylamine hydrochloride.

What is claimed is:

1. A process for the production of a compound of the formula:

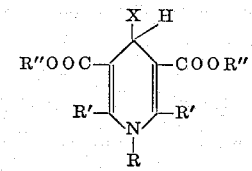

wherein
R is straight or branched chain, alkyl of up to 4 carbon atoms, allyl, or benzyl,
R' is hydrogen or straight or branched chain alkyl of 1 to 4 carbon atoms, phenyl, phenyl substituted by nitro or halogen, or pyridyl,
R'' is alkyl or alkoxyalkyl of 1 to 6 carbon atoms, and
X is straight or branched chain alkyl of up to 6 carbon atoms, phenyl, benzyl, or styryl, unsubstituted or substituted by methyl, methoxy, carbomethoxy, carbethoxy, methylthio, trifluoromethyl, nitrile, nitro, amino or halogen; pyridyl; thienyl; or tetrahydropyranyl,
which comprises
(a) reacting an aldehyde of the formula:

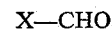

wherein X is as above defined, and
(b) a β-ketocarboxylic acid ester of the formula:

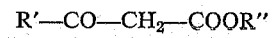

wherein R' and R" are as above defined, with
(c) a salt of an alkylamine of the formula:

R—NH₂ wherein R is as above defined, and
(d) in the presence of an acid acceptor, with the proviso that when one of the reactants already has acid-binding properties, the acid acceptor is present or absent.

2. A process according to claim 1 wherein the salt of an alkylamine is an acid addition salt with an inorganic or organic acid.

3. A process according to claim 2 wherein the acid addition salts are selected from the group consisting of a hydrohalic acid, sulphuric acid, nitric acid, phosphoric acid, and acetic acid.

4. A process according to claim 1 wherein the acid acceptor is present and is selected from the group consisting of tertiary amines, pyridine, picoline, quinoline, N-methyl-piperidine, N-methyl-morpholine, N,N-dimethyl-piperazine, and an alkylamine of the formula:

R—NH₂ wherein R is as therein defined.

5. A process according to claim 4 wherein the acid acceptor is pyridine.

6. A process according to claim 1 which further comprises recovering the product produced.

References Cited
UNITED STATES PATENTS 3,325,505   6/1967   Loev _____ 260—295.5 R
3,441,648   5/1970   Loev et al. _____ 260—295.5 R ALAN L. ROTMAN, Primary Examiner U.S. Cl. X.R.

260—240 D, 294.8 G, 294.9, 295.5 R; 424—266